United States Patent
Riddering et al.

(10) Patent No.: US 9,607,649 B1
(45) Date of Patent: Mar. 28, 2017

(54) DETERMINING WRITE-INDUCED PROTRUSION AS A FUNCTION OF LASER POWER USING TEMPERATURE MEASUREMENTS

(71) Applicant: Seagate Technology LLC, Cupertino, CA (US)

(72) Inventors: Jason Riddering, Prior Lake, MN (US); Huazhou Lou, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/093,882

(22) Filed: Apr. 8, 2016

(51) Int. Cl.
| | | |
|---|---|---|
| G11B 11/00 | (2006.01) | |
| G11B 7/1267 | (2012.01) | |
| G11B 5/09 | (2006.01) | |
| G11B 5/00 | (2006.01) | |
| G11B 7/1263 | (2012.01) | |
| G11B 11/105 | (2006.01) | |
| G11B 7/126 | (2012.01) | |

(52) U.S. Cl.
CPC .............. G11B 7/1267 (2013.01); G11B 5/09 (2013.01); *G11B 7/126* (2013.01); *G11B 7/1263* (2013.01); *G11B 11/1051* (2013.01); *G11B 11/10506* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,654,618 B1 | 2/2014 | Liu et al. | |
| 8,922,929 B1 | 12/2014 | Ruan et al. | |
| 9,123,370 B1 | 9/2015 | Ruan et al. | |
| 2012/0201108 A1 | 8/2012 | Zheng et al. | |
| 2014/0023108 A1* | 1/2014 | Johnson | G11B 5/6076 374/45 |
| 2014/0029396 A1* | 1/2014 | Rausch | G11B 13/04 369/13.23 |
| 2014/0139945 A1* | 5/2014 | Canchi | G11B 5/6029 360/75 |
| 2014/0269819 A1* | 9/2014 | Kiely | G11B 5/3116 374/45 |
| 2015/0235663 A1 | 8/2015 | Canchi et al. | |
| 2016/0232930 A1* | 8/2016 | Lou | G11B 5/607 |

\* cited by examiner

*Primary Examiner* — Tan X Dinh
(74) *Attorney, Agent, or Firm* — Hollingsworth Davis, LLC

(57) ABSTRACT

A test involves iterations over a series of laser powers of a heat-assisted read/write head. The iterations involve writing to a recording medium at the selected laser power for a sufficient duration to ensure thermal equilibrium of the read/write head at an end of the write. A clearance-control heater of the read/write head is transitioned from a pre-write power before a start of the write to a steady-state write power. The iterations further involve measuring a temperature of the read/write head during the write and adjusting the steady-state write power to achieve a predefined difference between the temperature at the start of the write and the end of the write. The adjusted steady state write power is stored for each iteration. A write-induced protrusion is determined based on the iterations and used for calibration of the read/write head.

20 Claims, 8 Drawing Sheets

DETERMINING WRITE-INDUCED PROTRUSION AS A FUNCTION OF LASER POWER USING TEMPERATURE MEASUREMENTS

SUMMARY

The present disclosure is directed to determining write-induced protrusion as a function of the laser power using temperature measurements. In one embodiment, a method involves performing iterations over a series of laser powers of a heat-assisted read/write head. The iterations involve writing to a recording medium at a selected laser power for a sufficient duration to ensure thermal equilibrium of the read/write head at an end of the write. A clearance-control heater of the read/write head is transitioned from a pre-write power before a start of the write to a steady-state write power. The iterations further involve measuring a temperature of the read/write head during the write and adjusting the steady-state write power to achieve a predefined difference between the temperature at the start of the write and the end of the write. The adjusted steady state write power is stored for each iteration. A write-induced protrusion is determined based on the iterations and used for calibration of the read/write head.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
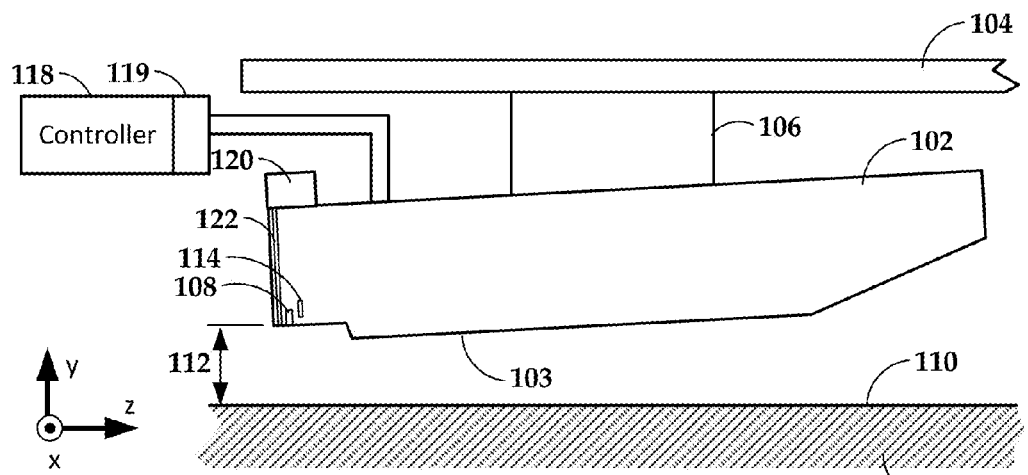
FIG. 1 is a block diagram of a hard disk drive slider and media arrangement according to an example embodiment.

The present disclosure generally relates to data storage devices that utilize magnetic storage media, e.g., disks. In some embodiments below, the devices use heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the paramagnetic effect.

A laser or other energy source may be directly (e.g., surface-attached) or indirectly (e.g., via optical fiber) coupled to a HAMR read/write head. An optical path (e.g., waveguide) is integrated into the read/write head and delivers the light to a media-facing surface of the read/write head. Because the size of the desired hotspot (e.g., 50 nm or less) is smaller than half a wavelength of the laser light (e.g., 800-1550 nm), conventional optical focusers (e.g., lenses) are diffraction limited and cannot be used to focus the light to create the hotspot. Instead, a near-field transducer (NFT) is employed to direct energy out of the read/write head. The NFT may also be referred to as a plasmonic transducer, plasmonic antenna, near-field antenna, nano-disk, nano-patch, nano-rod, etc.

Generally, the NFT is formed by depositing a thin-film of material such as gold, silver, copper, etc., a region of near an integrated optics waveguide or some other delivery system. When exposed to laser light that is delivered via the waveguide, the light generates a surface plasmon field on the NFT. The NFT is shaped such that the surface plasmons are directed out of a surface of the write head onto a magnetic recording medium.

Due to the intensity of the laser light and the small size of the NFT, the NFT and surrounding material are subject to a significant rise in temperature during writing. This can affect the clearances between the read/write head and the recording medium, sometimes referred to as fly height, head-to-media clearance, head-to-media spacing, etc. Generally, localized heating will result in a region surrounding the NFT to protrude even more than the surrounding components while writing. This is sometimes referred to as laser-induced write protrusion (LIWP). This protrusion results in a decrease in clearance between the NFT (and surrounding components) and the recording medium, and is generally not directly measurable in a production drive.

Many read/write heads utilize an embedded heater (e.g., resistive heater) to induce thermal protrusion in order to control head-to-media clearance. A single heater may be used for both read and write operations, or separate heaters may be used for read and write operations, respectively. The amount of current applied to the heater may be determined based on an open-loop and/or closed loop controller. Because the above-described LIWP contributes affects clearance during writing, control systems need to account for this when writing to the recording medium. In embodiments described below, a calibration involves determining what is referred to as LIWP slope. Generally, LIWP slope is the change in LIWP as a function of laser current, LDI, or dLIWP/dLDI. The protrusion slope can be used in drive operation to decrease/increase heater power as laser current is increased/decreased to maintain a desired write clearance.

Measuring HAMR LIWP slope may involve determining what the optimized laser current is or will be. For example, during HAMR LIWP slope calibration, laser input values will be increased up to a stopping point around the optimal laser current (and not past) so that extrapolation is not required. When the laser is first turned on in a HAMR drive, an estimated LIWP slope may be used to perform laser calibrations. Measuring LIWP slope is difficult due to the highly localized nature of the protrusion and the large scaling factors used for either contact-based or reader-based methods currently available. Reader-based methods involve writing test tracks at various laser and heater values and reading back the test tracks to estimate LIWP slope, and so require significant drive setup prior to being capable of taking the measurement. Contact-based methods involve increasing heater and/or laser input values until contact is detected (e.g., via acoustic emissions, temperature profiles), and the contact may damage the NFT. Methods and apparatuses described below enable simultaneous determination of the LIWP slope and initial laser calibration without the need for contact detection.

In reference now to FIG. 1, a block diagram shows a side view of a read/write head 102 according to an example embodiment. The read/write head 102 may be used in a magnetic data storage device, e.g., HAMR hard disk drive. The read/write head 102 may also be referred to herein as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

In order to provide control of the clearance between the read/write transducers 108 and the recording medium 111, one or more clearance actuators 114 (e.g., heaters) are formed in the read/write head 102. A current applied to the heater 114 induces a local protrusion which varies the clearance. The amount of current applied to the heater 114 may vary based on which of the read/write transducers 108 are in use, and may also be adjusted to account for irregularities in the media surface 110, changes in ambient temperature, location of the read/write head 102 over the medium 111, etc. Thermal sensors (not shown) may also be included in the read/write head 102 to facilitate measuring clearances, e.g., by measuring a thermal profile as a function of heater power.

A controller 118 is coupled to the read/write transducers 108, as well as other components of the read/write head 102, such as heaters 114, sensors, etc. The controller 118 may be part of general- or special-purpose logic circuitry that controls the functions of a storage device that includes at least the read/write head 102 and recording medium 111. The controller 118 may include or be coupled to a read/write channel 119 that include circuits such as preamplifiers, buffers, filters, digital-to-analog converters, analog-to-digital converters, decoders, encoders, etc., that facilitate electrically coupling the logic of the controller 118 to the signals used by the read/write head 102 and other components.

The illustrated read/write head 102 is configured as a HAMR device, and so includes additional components that form a hot spot on the recording medium 111 near the read/write transducer 108. These components include a laser 120 (or other energy source) and a waveguide 122. The waveguide 122 delivers light from the laser 120 to components near the read/write transducers 108. These components are shown in greater detail in FIG. 2, which is a block diagram illustrating a cross-sectional view of the read/write head 102 near the read/write transducers 108 according to an example embodiment.

A read transducer 108a is located downtrack from a write transducer 108b. The read transducer 108a may be configured as a magnetoresistive stack (e.g., giant magnetoresistive, tunnel magnetoresistive, etc.) surrounded by magnetic shields. The write transducer 108b includes a coil 200 that, when energized, induces magnetic flux through a write pole 202 and return poles 204, 206. The aforementioned waveguide 122 delivers light to an NFT 202 located near the write pole 202.

Figure 2:
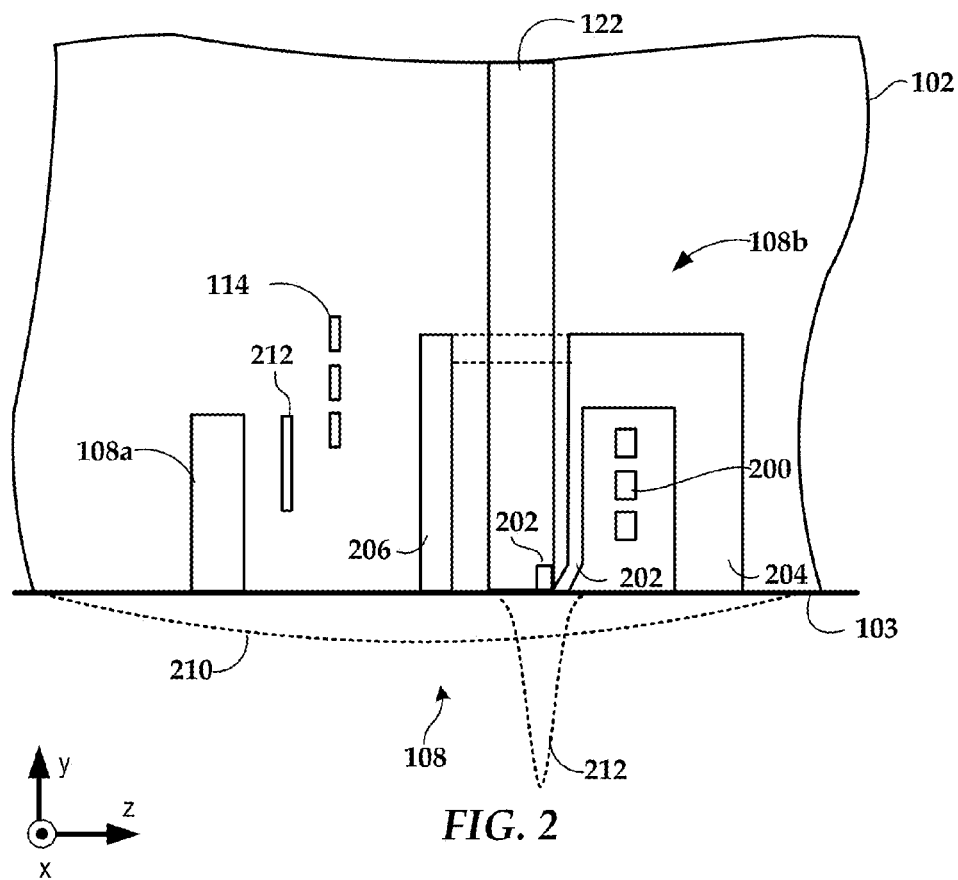
FIG. 2 is a cross-sectional view of a read/write head according to an example embodiment.

The diagram of FIG. 2 shows protrusion near the read/write transducer 108 at the media-facing surface 103. During reads and writes, the heater 114 is activated to control protrusion of the read transducer 108a and write transducer 108b, as generally indicated by broad protrusion shape 210. The write pole 202 and other components of the magnetic writer may also heat significantly while writing, and so contribute to the broad protrusion 210 during write operations. The broad protrusion shape 210 is not necessarily to scale, other than to indicate that it is occupies a fairly broad region near the read/write transducer 108. In contrast, the optical components such as NFT 202 and waveguide 122 cause a narrower protrusion 212. The narrow protrusion 212 covers a smaller region than the broad protrusion 210. This narrow protrusion 212 may also extend further away from the media-facing surface 103 than the broad protrusion 210.

Another distinguishing feature of the narrow protrusion 212 is the time constant, e.g., the relative amount of time it takes to maintain a stable shape after application of heat via the energy source. The narrow protrusion 212 can have a time constant on the order of $1/10$ to $1/100$ of the broad protrusion 210. Therefore the narrow protrusion 212 can react significantly faster to input from the energy source compared to the broad protrusion's response to activation of the heater 116.

The read/write head 102 also includes a thermal sensor 212 located near the read/write transducers 108. In this example, the thermal sensor 212 is located between the read transducer 108a and the write transducer 108b, although other locations are possible, as are additional sensors. The thermal sensor 212 is fabricated as part of the transducer wafer-forming process. The thermal sensor 212 may be configured to detect changes in temperature as a change in resistance due to a known temperature coefficient of resistance (TCR) of the sensor material. The following equation can be used to determine temperature of the thermal sensor: $TCR = R_0^{-1} * dR/dT$, where $R_0$ is the value of resistance at a reference temperature, and where dR and dT are respective changes in resistance and temperature. In the following examples, the thermal sensor 212 may be described as a dual-ended TCR sensor (DETCR), but other types of thermal sensors may be used instead or in addition to a DETCR sensor.

Figure 3:
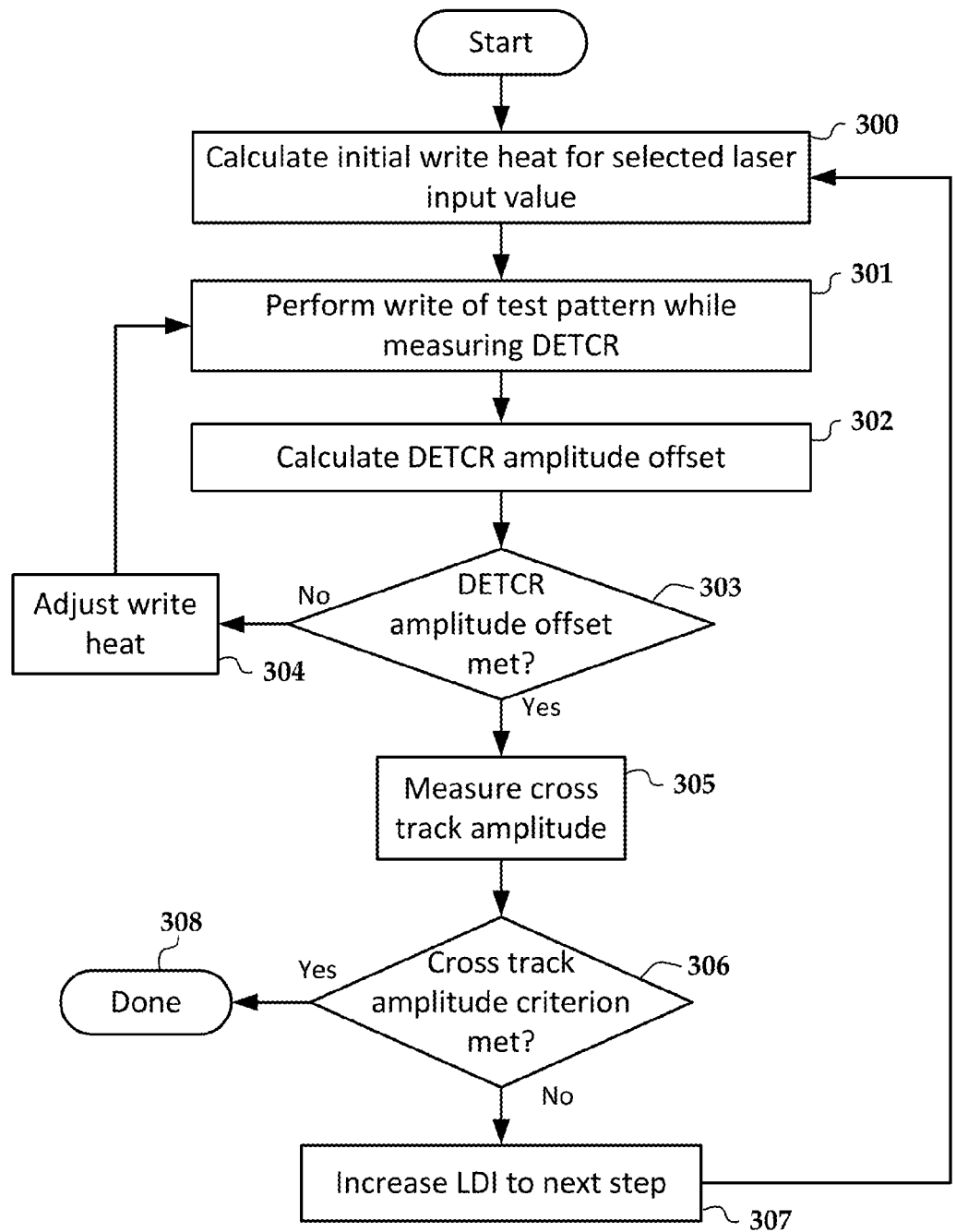
FIG. 3 is a flowchart of a method according to an example embodiment

As described below, a method based on DETCR amplitude is used to determine LIWP slope. An example embodiment of this method is shown in the flowchart of FIG. 3. The method starts by calculating 300 an initial writer heater input value for the current laser input value. Both of these heater and laser input values may be digital-to-analog (DAC) input values, and are used to set a power level (e.g., by setting current) for the respective heater and laser. Note that the heater value includes both a pre-heat value and a steady-state heater value. Generally, the pre-heat value is an additional amount of heater power that is applied prior to writing to compensate for the writer protrusion that will occur at the start of writing. The writer power transitions from pre-heat to steady-state values after the write begins and the writer comes into thermal equilibrium.

After calculating 300 the values, a test pattern is written 301, e.g., to one or more test tracks using the selected laser and write heat values. The DETCR is configured prior to writing by setting gain, bias, filtering, etc. to appropriate levels. While writing 301 the data, the DETCR value is measured from the start to the end of the write and recorded (e.g., in a memory buffer). This DETCR data is then used to determine 302 an amplitude offset from the beginning of the write to the end of the write. The DETCR amplitude at the start of the write is determined by the amount of pre-write heat applied to achieve pre-write clearance. The DETCR amplitude at the end of the write is determined by the steady-state values of write heat, writer current, and laser current.

Figure 4A:
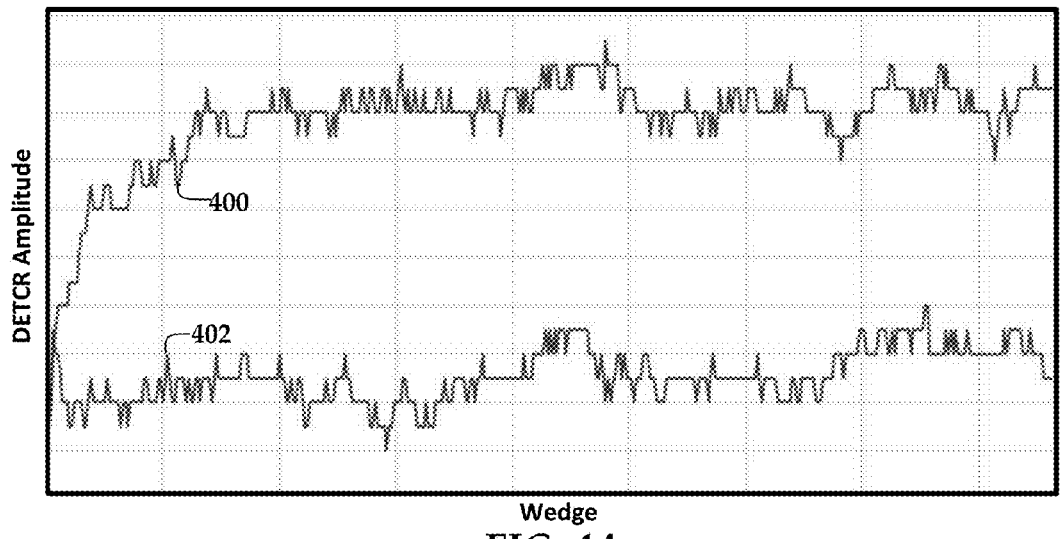
FIGS. 4A and 4B are graphs showing aspects of measuring write clearance according to example embodiments.

An example of determining 302 amplitude offset is shown in the graph of FIG. 4A. For this graph, a digital value of DETCR value is returned wedge-by-wedge for different conditions as indicated by curves 400 and 402. Curve 400 indicates a case where amount of write heat applied to achieve steady-state write clearance is too high. The DETCR amplitude of curve 400 is significantly higher at the end of the write compared to the start of the write, indicating more heat at the DETCR element during writing compared to pre write. In contrast, the DETCR amplitude of curve 402, which was achieved using a lower steady-state write heat setting, achieves a relatively constant value from beginning to end of the write. It will be understood that other curve shapes may be seen in the testing, e.g., one that starts out at the indicated DETCR amplitude of curves 400, 402 and then substantially decreases during steady-state part of writing.

Figure 4B:
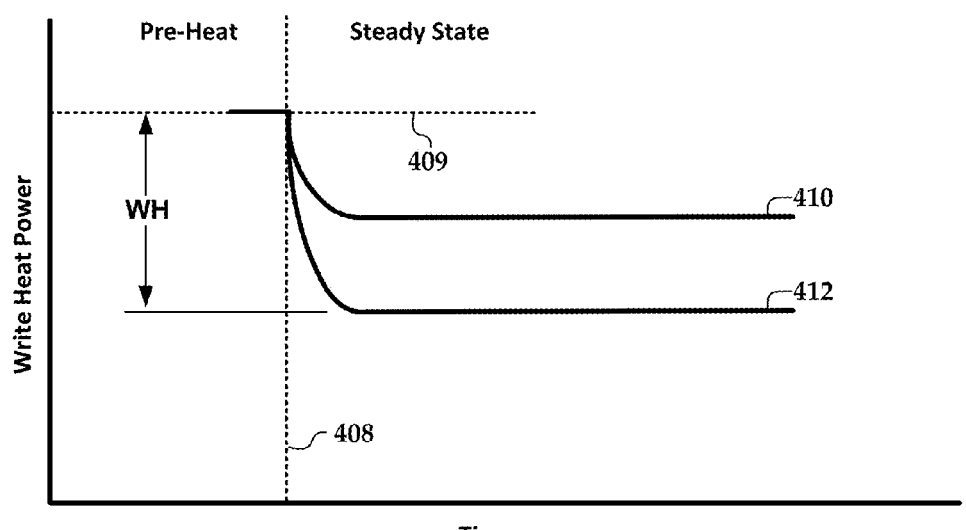

In FIG. 4B, a graph shows example of write heat power curves that may result in the DETCR amplitudes of FIG. 4A. Time 408 represents the beginning of writing, and curves 410 and 412 represent two power levels applied to the heater elements. For both curves 410, 412, the power at the pre-heat phase is set to the same power level 409. The steady-state power level of curve 412 is lower, and may result in the desired DETCR amplitude curve 402 in FIG. 4A. In contrast, the higher steady-state power level of curve 410 may result in the DETCR amplitude curve 400 in FIG. 4A.

It should be noted that, while the curves 400 and 402 in FIG. 4A are representative of head-to-media clearance, the goal of this phase of testing is to ensure that the clearance is substantially constant throughout the writing. Prewrite clearance is deemed to be correct, and write heat is adjusted to match write clearance to prewrite clearance as laser current is increased using the DETCR response as feedback for adjustment. In this example, if the power curve 412 resulted in an acceptable DETCR amplitude 402, then it may be assumed that the value of ΔWH in FIG. 4B is representative of writer protrusion and LIWP at this laser power level. Because the actual write process is mimicked during this calibration process, both the protrusion from the write coils and the laser are compensated by the writer heater simultaneously. In this way, the delta writer heater (ΔWH) vs delta laser curve (ΔLDI) gives a LIWP slope that will achieve the desired write clearance over the range of laser currents.

In reference again to FIG. 3, the offset calculated at block 302 is checked at block 303 to determine whether the DETCR amplitude meets some criterion, e.g., relatively constant from the beginning to the end of the write. This may involve averaging values and setting a range. For example, n-DETR measurements may be averaged at the start of the write to obtain $DETCR_1$ and m-DETCR measurement values may be averaged at the end of the write to obtain $DETCR_2$. If $|DETCR_1 - DETCR_2|$ is less than a threshold, then the criterion at block 303 may be satisfied. In other cases, a series of heater levels may be used such that the steady-state DETCR is both higher and lower than the pre-heat DETCR for at least two of the heater levels. In such a case, a heater level can be selected (e.g., via interpolation) that minimizes the difference between the pre-heat and steady-state DETCR.

If the criterion at block 303 is not met, the write heat is adjusted 304 accordingly and the test pattern re-written and re-tested through loop 301-304 until the criterion is met. The laser and write heat values set at block 300 before entering the loop 301-304 the first time may be initially set to some known default. For example, at zero laser current, no laser protrusion slope is required to calculate the starting write heat. As laser current is increased during subsequent iterations, a starting write heat set at block 300 can be estimated to achieve a target initial pre-write DETCR amplitude that is close to the steady-state write DETCR amplitude. This starting value can be calculated using a conservative protrusion slope or based on the previous results. The starting write heat at block 300 may be chosen such that an increase is necessary at block 304 to achieve the target DETCR offset.

Figure 5:
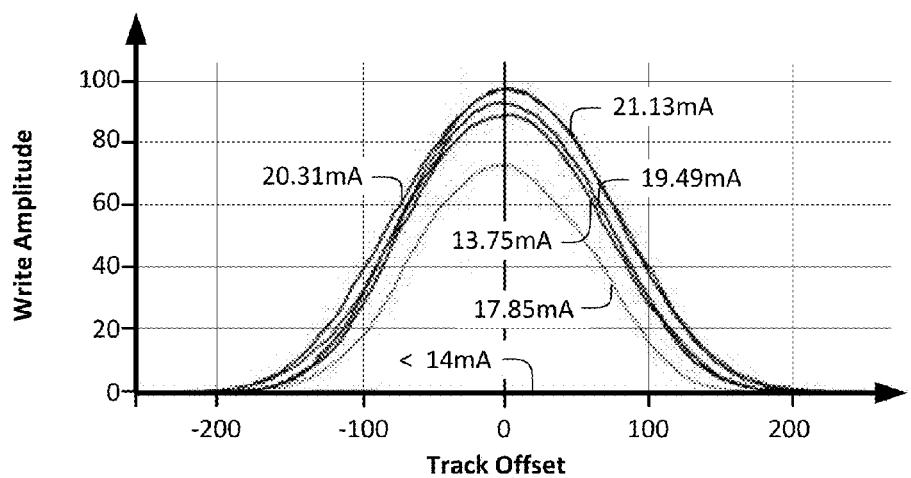
FIGS. 5 and 6 are graphs showing the measurement of written amplitude according to example embodiments.
Figure 6:
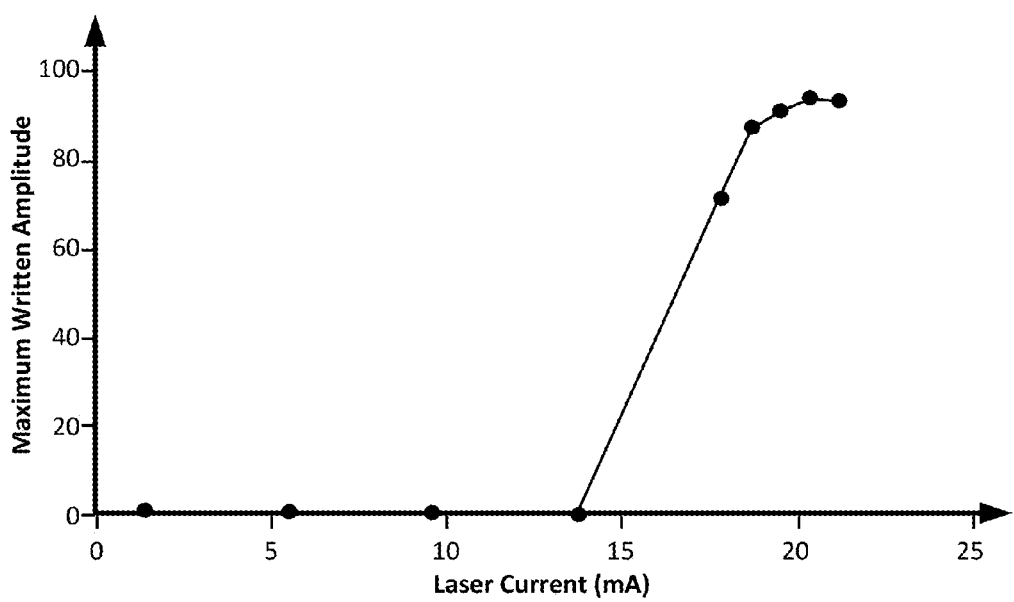

Once the DETCR amplitude criterion is met, block 303 returns 'yes' and cross track amplitude of the signal is measured 305. This may involve reading back the track at a series of positive and negative servo offsets from track center and recording the amplitude at each offset. In FIG. 5, a plot shows an example of offset profiles read at various laser current values. Note that at currents below approximately 14 mA in this example, there is insufficient laser heating to cause the recording medium to reach the Curie temperature. As a result, maximum cross-track amplitude is at or close to zero. In FIG. 6, a line plot shows the maximum amplitudes of the curves shown in FIG. 5 as a function of laser current.

In reference again to FIG. 3, the cross track amplitude is compared 306 to a criterion. For example, this may involve checking the cross track amplitude for write saturation. This can be done by using a plot such as shown in FIG. 6. At the peak of the curve in FIG. 6, write saturation has occurred. Additional measurements at higher laser powers beyond the peak may be performed to ensure that the subsequent amplitude readings shown a decrease. In other cases, measurements may be performed up to a maximum safe laser current regardless of the measured amplitude.

Note that the cross track amplitudes as shown in FIG. 5 may not be centered for an un-calibrated head because read/write offset has not been established at initial laser calibration. This is not a problem however because the search window for the peak amplitude can be multiple tracks until a measureable amplitude has been achieved to find the actual track center. In such a case, a plot such as FIG. 6 can still be constructed from this data.

Other methods based on amplitude could also be used to determine 306 whether the cross-track amplitude meets the criterion. For example, parameters such as area under the amplitude curves in FIG. 5, average or median values of the curves in FIG. 5, etc., may be used to determine whether the writer is saturated at the given heater and laser values. If the criterion determined at 306 is not met, then the laser diode current is increased 307, and the process beginning at block 300 begins again. When the criterion determined at 306 is met, the routine is complete 308.

Figure 7:
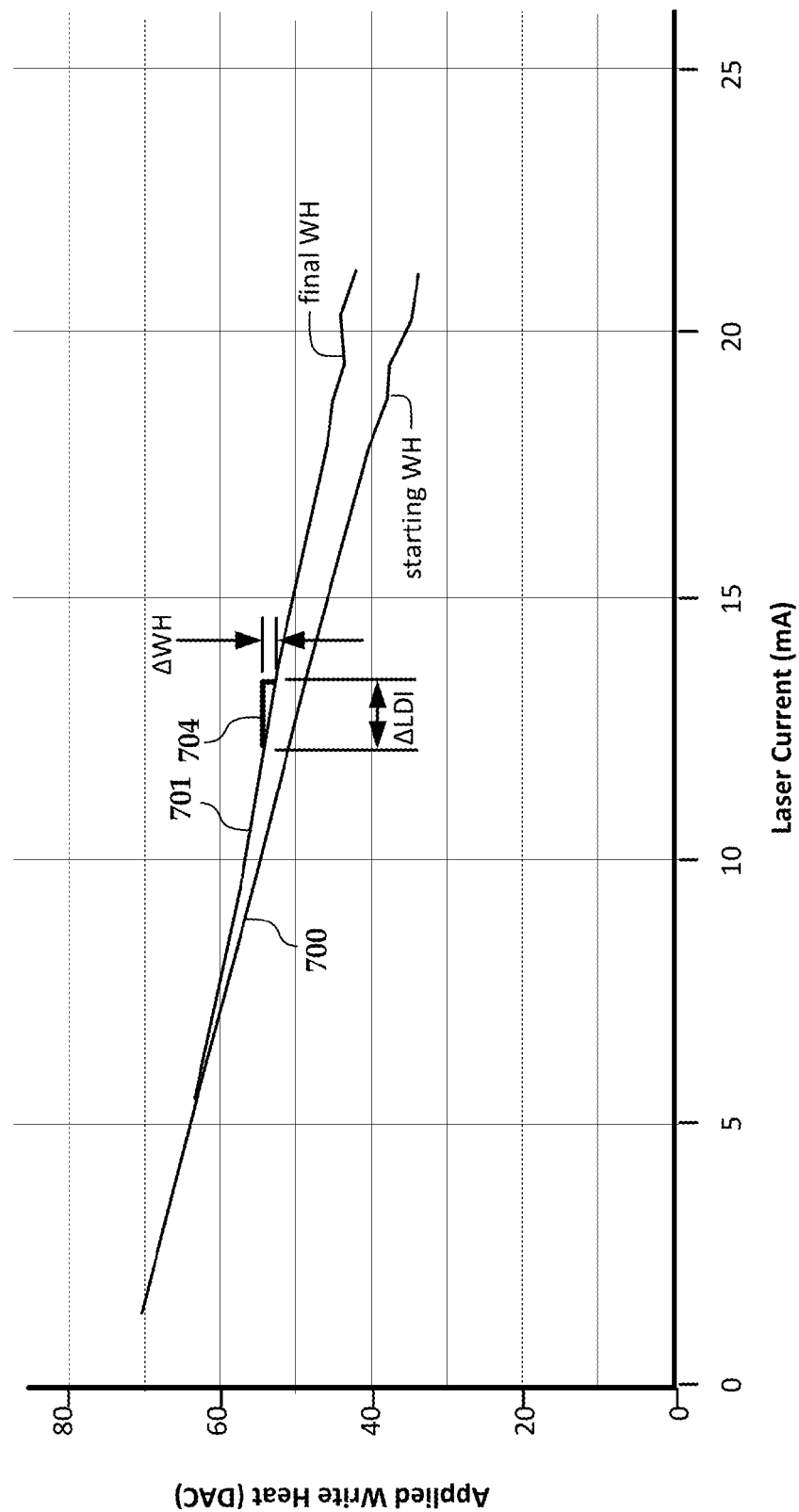
FIG. 7 is a graph showing the determination of protrusion as a function of laser power according to an example embodiment.

The outcome of the procedure in FIG. 3 is a series of starting and final write heat values for a range of laser values. In FIG. 7, a graph shows an example of laser current and write heat values determined using the procedure shown in FIG. 3. Laser current in FIG. 7 is effective laser current, which represents the laser current beyond the initial laser turn on point where protrusion starts to occur. This initial laser turn on point will be referred to herein as zero effective laser power/current, in that some current may be flowing through the laser to maintain an operating point, but no lasing occurs at the zero effective laser power/current. The leftmost point of the curves 700, 701 represent the zero effective laser current for this case, even though the actual current (e.g., bias current) is non-zero.

Curve 700 represents the starting write heat determined for a range of laser values and curve 701 represents the ending write heat for the same range. These two curves illustrate a starting write heat that is conservative and causes the write heat to be increased to the final value which means that the starting clearance is high to target and therefore approaches the optimal write heat from a safe direction. If the starting write heat is high to target and reduces during the calibration process, the optimal write heat will still be found, but the starting write clearance will actually be low to target and therefor may be damaging to the head. The slope 704 represents $\Delta WH/\Delta LDI$, which corresponds to LIWP slope (e.g., dLIWP/dLDI). For example, $\Delta WH/\Delta LDI$ may be scaled by a constant value or a non-constant function to obtain LIWP slope. The values of LIWP are saved to the drive or elsewhere (e.g., stored in volatile or non-volatile memory of the drive or a test stand) and used for subsequent laser current adjustments and other calibration procedures.

Figure 8:
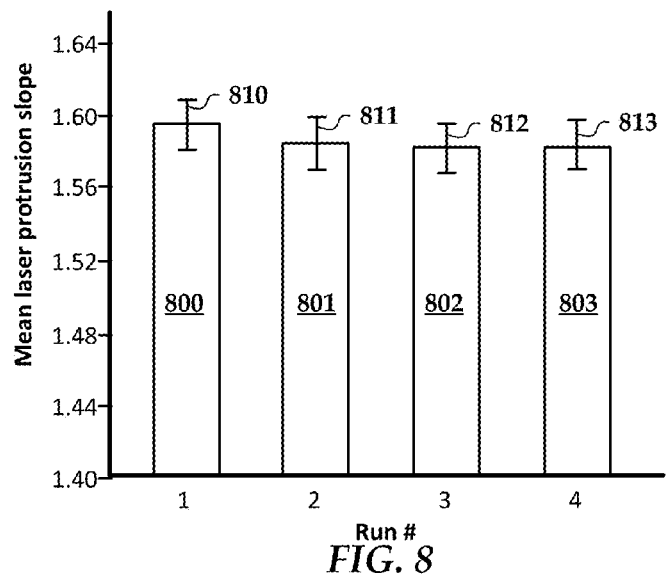
FIGS. 8 and 9 are graphs showing measured protrusion slope using methods according to example embodiments.
Figure 9:
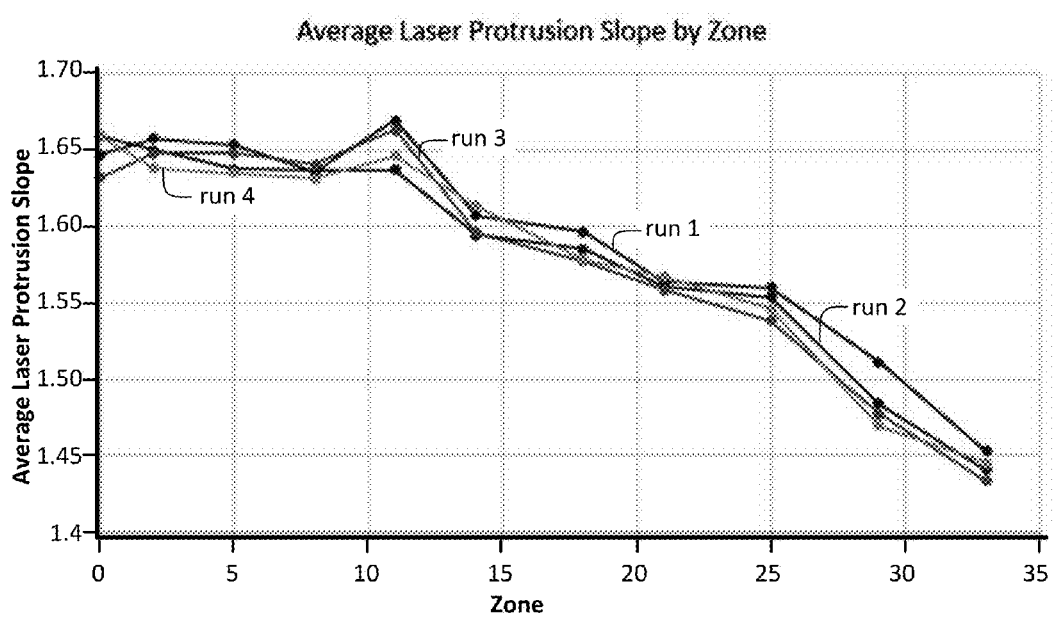

In FIG. 8, a bar graph shows measurement of laser calibration and LIWP slope measurement for a HAMR device according to an example embodiment. These measurements were made ten times over four runs on a middle zone of the device. Each of the bars 800-803 in the graph represents a mean of the ten measurements made for each run. The error bars 810-813 represent respective 95% confidence intervals (pooled) of each mean value 800-803. In FIG. 9, a graph shows average laser protrusion over different zones for each of the four runs.

Figure 10:
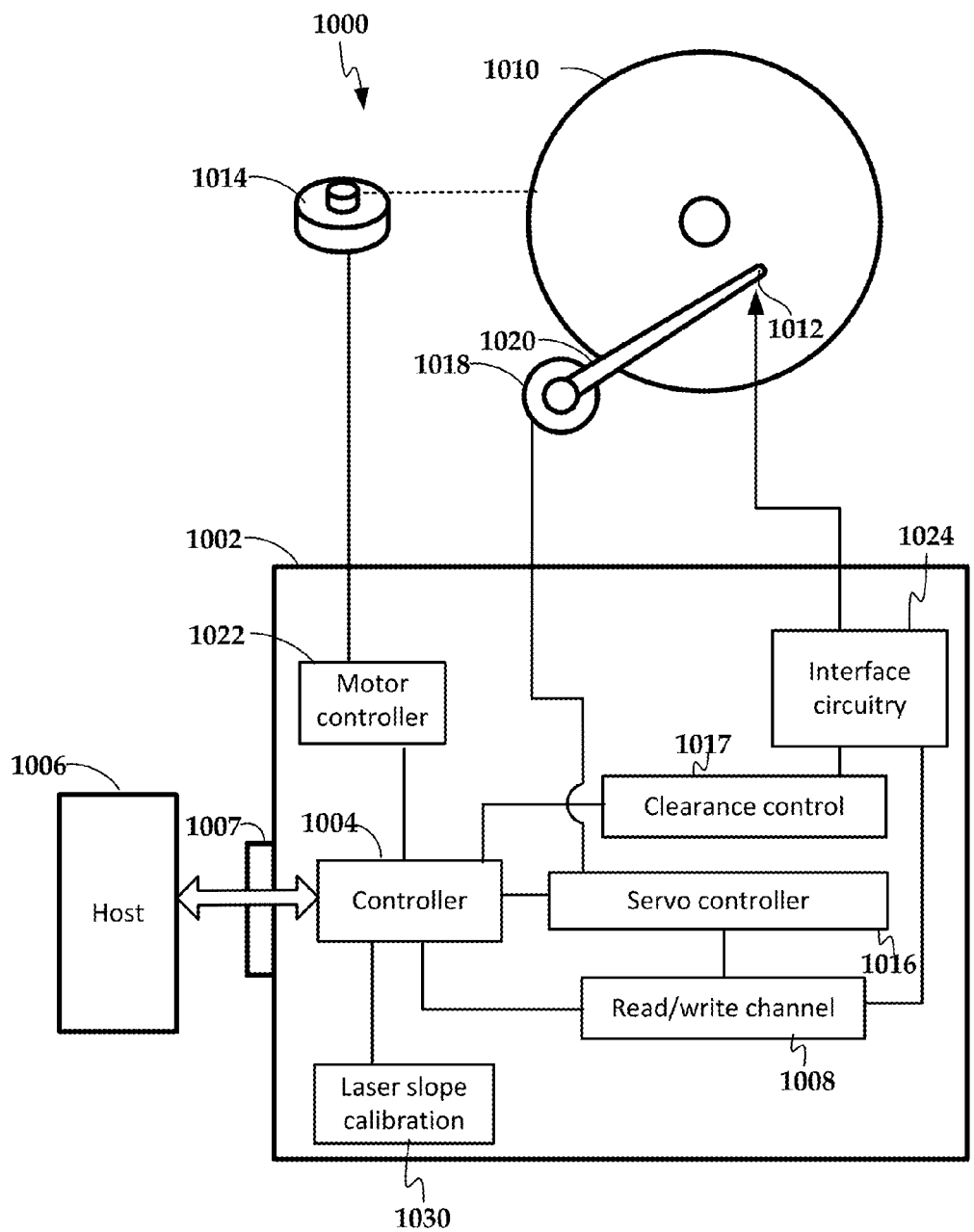
FIG. 10 is a block diagram of an apparatus and system according to an example embodiment.

Generally, the methods described above may be performed in any apparatus that utilizes a HAMR writer and recording medium, including hard disk drives and test stands. In reference now to FIG. 10, a block diagram illustrates components of system 1000 according to an example embodiment. The system 1000 includes a HAMR hard drive apparatus 1002 having to one or more read/write heads 1012. The apparatus 1002 includes a system controller 1004 that controls a number of functions of the system 1000, such as communications between the apparatus 1002 and a host device 1006 via a host interface 1007. The host device 1006 may include any electronic device that can be communicatively coupled to communicate with the apparatus 1002, e.g., a general-purpose computer, a factory test apparatus, remote terminal, etc.

The system controller 1004 may include any combination of custom logic circuits, application specific integrated circuits (ASICs), general-purpose central processing unit (CPU), interface circuits, etc., and may utilize instructions stored as firmware and/or software. The system controller 1004 may process instructions to read data from and write data to a recording medium (e.g., disk 1010) via a read/write channel 1008. The system controller 1004 may, among other things, determine a location on the disk 1010 for the desired data, move the heads to the location (track) of the data, read or write the data via the read/write channel 1008, correct errors, transfer the data to/from the host 1006, etc.

The read/write channel 1008 converts data between the digital signals processed by the data controller 1004 and the analog signals conducted through read/write heads 1012.

The read/write channel 1008 also provides servo data read from the disk 1010 to a servo controller 1016. The servo controller 1016 uses these signals to drive an actuator 1018 (e.g., voice coil motor) that rotates an arm 1020, upon which the read/write heads 1012 are mounted. The heads 1012 are moved radially across different tracks of the disk(s) 1010 by the actuator motor 1018 (e.g., voice coil motor), while a spindle motor 1014 rotates the disk(s) 1010. A microactuator (not shown) may also be included to provide finer tracking control, and also receives inputs from the servo controller 1016. The controller 1004 controls the spindle motor 1014 by way of a motor controller 1022.

During write operations, the read/write channel 1008 provides analog signals that are delivered to the read/write heads 1012 by way of interface circuitry 1024. The interface circuitry 1024 include hardware components (preamplifiers, filters, analog-to-digital converters, digital-to-analog converters) that conditions the signals sent to and received from the read/write heads 1012. In the illustrated embodiment, the interface circuitry 1024 also includes laser control circuitry that energizes a laser (or other energy source) at each of the read/write heads 1012 during write operations. The laser control circuitry conditions the signals to ensure the lasers provide sufficient energy to heat a spot on the disk 1010 as it is being recorded. Other signals sent to or received from the read/write head 1012 may also be conditioned via the preamplifier, such as heater control signals, sensor signals, etc. For example, a clearance control module 1017 may read sensor data from the read/write heads 1012 (e.g., DETCR sensor data) to determine current clearance, and modify a signal applied to a heater of the read/write heads 1012 to adjust the clearance accordingly.

A LIWP slope calibration module 1030 may perform data collection and testing as described above. For example, the LIWP slope calibration module 1030 may iterate through a series of laser powers of one or more of the read/write heads 1012. Each iteration involves, using a selected laser power, performing a write to the recording medium 1010 of sufficient duration to ensure thermal equilibrium of the read/write head 1012 at an end of the write. A clearance-control heater of the read/write head 1012 is transitioned from a pre-write power before a start of the write to a steady-state write power. A temperature of the read/write head 1012 is measured during the write (e.g., via an integrated DETCR sensor) and the steady-state write power is adjusted to achieve a predefined difference between the temperature at the start of the write and the end of the write (this may take multiple writes operations to achieve). The adjusted steady-state heater power is stored to memory and associated with the selected laser power for each iteration. The write-induced protrusion as a function of the laser power (which can be used to calculate LIWP slope) is determined based on the stored adjusted steady-state heater powers associated with the series of laser powers. The function can be used for further calibration operations of the read/write heads 1012.

Figure 11:
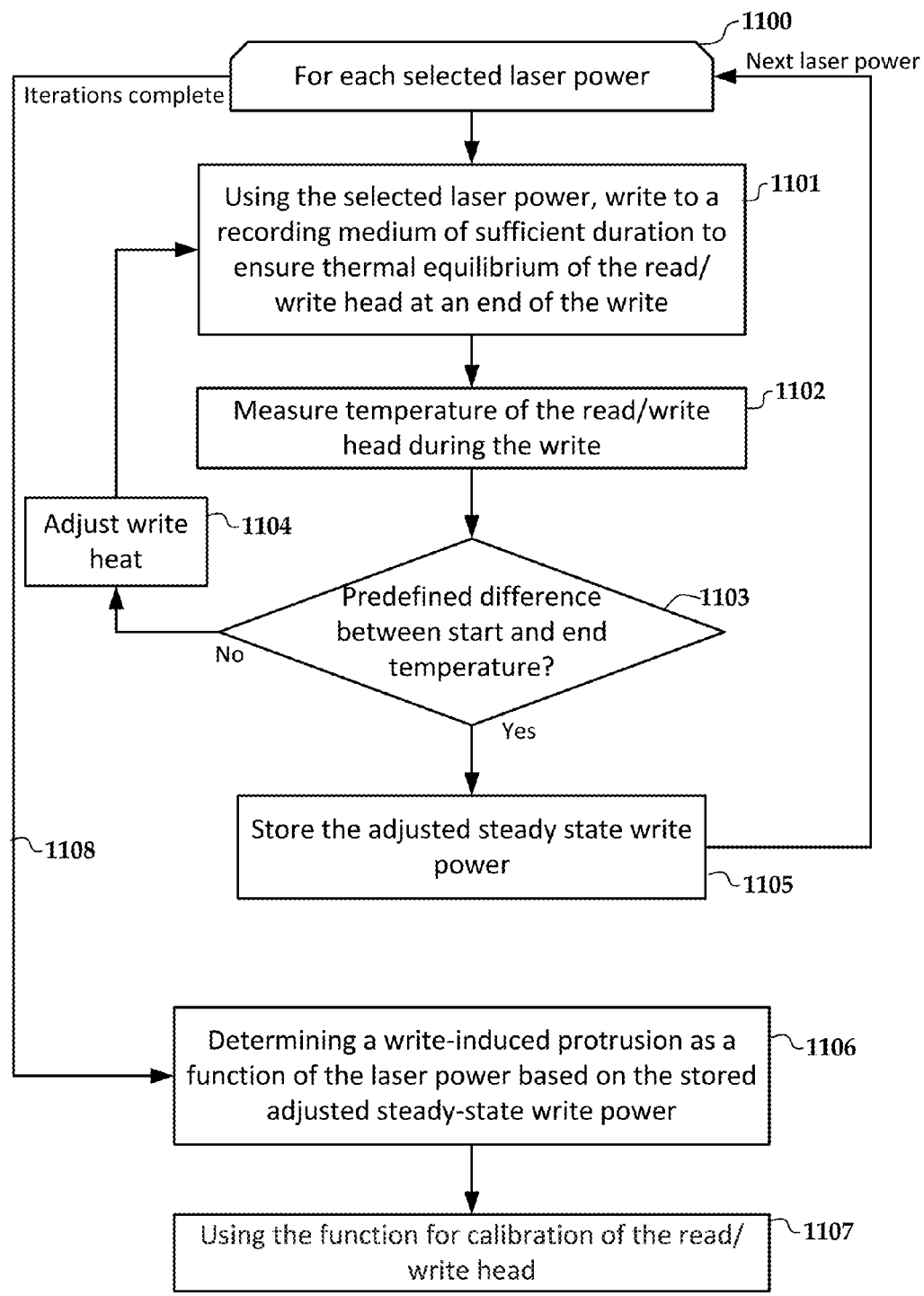
FIG. 11 is a flowchart of a method according to an example embodiment.

In FIG. 11, a flowchart illustrates a method according to another example embodiment. The method involves performing an iteration as indicated by loop limit 1100. For each iteration, each of a series of laser powers of a heat-assisted read/write head is selected. Using the selected laser power, the iteration involves writing 1101 to a recording medium for a sufficient duration to ensure thermal equilibrium of the read/write head at an end of the write. A clearance-control heater of the read/write head is transitioned from a pre-write power before a start of the write to a steady-state write power. The laser power is transitioned from a zero effective laser power before the start of the write to the selected laser power. A temperature of the read/write head is measured 1102 during the write. The steady-state write power is adjusted to achieve a predefined difference between the temperature at the start of the write and the end of the write as determined at block 1103.

Once the predefined temperature difference is achieved, the adjusted steady-state heater power is stored 1105 (e.g., in volatile or non-volatile memory). For example, the adjusted, steady-state heater power WH for a selected laser current LDI can stored in memory as an ordered pair such as (WH, LDI). After the iterations (as indicated by path 1108) write-induced protrusion as a function of the laser power is determined based on the stored adjusted, steady-state heater powers associated with the series of laser powers, e.g., determining a function and/or slope of stored collection of (WH, LDI) pairs. The function/slope is used for calibration of the read/write head, e.g., used to determine LIWP slope. The heater power function and LIWP slope can be used for subsequent laser power and clearance calibrations.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
    performing, for each selected laser power of a series of laser powers of a heat-assisted read/write head, iterations comprising:
        using the selected laser power, write to a recording medium for a sufficient duration to ensure thermal equilibrium of the read/write head at an end of the write, a clearance-control heater of the read/write head being transitioned from a pre-write power before a start of the write to a steady-state write power;
        measuring a temperature of the read/write head during the write;
        adjusting the steady-state write power to achieve a predefined difference between the temperature at the start of the write and the end of the write; and
        storing the adjusted steady state write power; and
    determining write-induced protrusion as a function of the laser power based on the stored adjusted steady state write powers; and
    using the function for calibration of the read/write head.

2. The method of claim 1, wherein the iterations further comprise
    measuring a cross-track amplitude of the write using the adjusted steady-state write power of the heater; and
    if the cross-track amplitude satisfies a criterion, stopping the iterations.

3. The method of claim 2, wherein the criterion comprises an indication of write saturation.

4. The method of claim 1, wherein achieving the predefined difference comprises minimizing a difference between the temperature at the start of the write and at the end of the write.

5. The method of claim 1, wherein achieving the predefined difference comprises a difference between the temperature at the start of the write and at the end of the write being less than a threshold.

6. The method of claim 1, wherein the temperature is measured via a thermal sensor integrated into the read/write head.

7. The method of claim 1, further comprising using a slope of the function to determine a laser-induced write protrusion slope.

8. The method of claim 7, wherein the laser-induced write protrusion slope is scaled from the slope of the function by a constant value.

9. The method of claim 1, further comprising, for each iteration, transitioning the laser power being from a zero effective laser power before the start of the write to the selected laser power.

10. An apparatus, comprising:
    interface circuitry configured to communicate with a heat-assisted read/write head; and
    a processor coupled to the interface circuitry and configured to:
        perform, for each selected laser power of a series of laser powers of the read/write head, iterations comprising:
            using the selected laser power, write to a recording medium for a sufficient duration to ensure thermal equilibrium of the read/write head at an end of the write, a clearance-control heater of the read/write head being transitioned from a pre-write power before a start of the write to a steady-state write power;
            measuring a temperature of the read/write head during the write;
            adjusting the steady-state write power to achieve a predefined difference between the temperature at the start of the write and the end of the write; and
            storing the adjusted steady-state write power; and
        determine write-induced protrusion as a function of the laser power based on the stored adjusted steady state; and
        use the function for calibration of the read/write head.

11. The apparatus of claim 10, wherein the iterations further comprise
    measuring a cross-track amplitude of the write using the adjusted steady write power of the heater; and if the cross-track amplitude satisfies a criterion, stopping the iterations.

12. The apparatus of claim 11, wherein the criterion comprises an indication of write saturation.

13. The apparatus of claim 10, wherein achieving the predefined difference comprises minimizing a difference between the temperature at the start of the write and at the end of the write.

14. The apparatus of claim 10, wherein achieving the predefined difference comprises a difference between the temperature at the start of the write and at the end of the write being less than a threshold.

15. The apparatus of claim 10, wherein the temperature is measured via a thermal sensor integrated into the read/write head.

16. The apparatus of claim 10, wherein the processor is further configured to use a slope of the function to determine a laser-induced write protrusion slope.

17. The apparatus of claim 16, wherein the laser-induced write protrusion slope is scaled from the slope of the function by a constant value.

18. The apparatus of claim 10, wherein the apparatus comprises a hard disk drive.

19. The apparatus of claim 10, wherein the apparatus comprises a test stand.

20. A system, comprising:
a heat-assisted read/write head comprising:
　a laser;
　a thermal sensor; and
　a clearance control heater;
a heat-assisted recording medium; and
a processor coupled to the read/write head and configured to:
　perform, for each of a series of selected laser power of the laser, iterations comprising:
　　using the selected laser power, write to the recording medium for a sufficient duration to ensure thermal equilibrium of the read/write head at an end of the write, the clearance-control heater being transitioned from a pre-write power before a start of the write to a steady-state write power, the laser power being transitioned from a zero effective laser power before the start of the write to the selected laser power;
　　measuring a temperature via the thermal sensor during the write;
　　adjusting the steady-state write power to achieve a predefined difference between the temperature at the start of the write and the end of the write; and
　determine a slope of write-induced protrusion as a function of the laser power based on the stored, adjusted steady-state write powers; and
　use the function for calibration of the read/write head.

* * * * *